United States Patent [19]
Blanch et al.

[11] 3,808,382
[45] Apr. 30, 1974

[54] ELECTRIC CORD REEL CONSTRUCTION

[75] Inventors: Charles H. Blanch, Maple Heights; James W. Kovacik, Parma, both of Ohio

[73] Assignee: Alert Stamping & Mfg. Co., Inc., Bedford Heights, Ohio

[22] Filed: Oct. 20, 1972

[21] Appl. No.: 299,246

Related U.S. Application Data

[63] Continuation-in-part of Ser. No. 124,328, March 15, 1971, Pat. No. 3,715,526, which is a continuation-in-part of Ser. No. 859,701, Sept. 22, 1969, Pat. No. 3,619,518.

[52] U.S. Cl. .......................................... 191/12.2 R
[51] Int. Cl. ........................................... H02g 11/00
[58] Field of Search ...................... 191/12.2 R, 12.4

[56] References Cited
UNITED STATES PATENTS

| | | | |
|---|---|---|---|
| 3,450,369 | 6/1969 | Blanch | 191/12.2 R |
| 3,617,659 | 11/1971 | Freeman | 191/12.2 R |
| 2,647,960 | 8/1953 | Benjamin | 191/12.4 |
| 3,182,139 | 5/1965 | Meletti | 191/12.4 |
| 3,619,518 | 11/1971 | Blanch | 191/12.2 R |

Primary Examiner—M. Henson Wood, Jr.
Assistant Examiner—D. W. Keen
Attorney, Agent, or Firm—Wesley B. Taylor

[57] ABSTRACT

An improved electric cord is described, characterized by limited flexibility of the reel in a radial plane with respect to its axis of rotation. In one form, the reel comprises a tubular hub having an apertured wall member extending across the interior of the hub. The hub and wall member are preferably integrally formed from a flexible plastic material. The aperture of the wall member is oversized with respect to a shaft extending axially through the hub, so as normally to avoid a bearing relation between the hub and shaft, especially in a direction radially of the hub. Instead, a commutator block fitted within the hub has a tubular projection defining a bearing for the shaft. In use, the hub has a limited degree of resilient, flexible movement toward and away from the shaft to absorb shocks and to avoid undue stress and strain on the reel and possible breakage. However, after a predetermined amount of flexing, radial movement, engagement between an edge of the aperture in the wall member and the shaft brakes further differential radial movement.

12 Claims, 8 Drawing Figures

PATENTED APR 30 1974 3,808,382

PATENTED APR 30 1974 3,808,382

ELECTRIC CORD REEL CONSTRUCTION

CROSS-REFERENCE TO APPLICATIONS

This application is a continuation-in-part of an application filed in the names Charles H. Blanch and James W. Kovacik on Mar. 15, 1971, entitled "Miniaturized Electric Cord Reel", Ser. No. 124,328, now U.S. Pat. No. 3,715,526 which is a continuation-in-part of an application filed on Sept. 22, 1969, entitled "Electric Cord Reel Construction", Ser. No. 859,701, now U.S. Pat. No. 3,619,518.

BACKGROUND OF THE INVENTION

The present invention relates to electric cord reels and, more particularly, to such reels of improved, simplified structure embodying relatively lightweight parts adapted for quick assembly, and in which the reel has a limited degree of free radial movement with respect to its axis of rotation to absorb mechanical shocks and the like.

Electric cord reels have been in use for many years, such as for paying out and receiving electric cord for lead lights, various electrical household appliances like sweepers, and in general wherever insulated electric conductors are to be optionally extended and retracted with respect to a relatively stationary point. While exterior designs may vary, electric cord reels basically comprise a reel and shaft mounted to rotate relatively to each other; cooperating ratchet and pawl means carried by the shaft and reel, respectively, to arrest the turning of a reel at one of several selective rotary stations when the length of the cord paid out reaches a desired length; a coiled spring designed to rotate the reel in a backward direction and rewind the cord onto the reel when the ratchet and pawl are disengaged; and electrical input means including a commutator and the insulated electrical cord itself.

To the present time, there have been no known attempts to construct an electric cord reel of simplified structure in which provision is made for resiliently accommodating the often reversing rotary movement of the reel, and for thereby absorbing shocks on the reel construction, applied as by jerking the electric cord or otherwise mistreating the reel during use. In this manner a reel can be subjected to undue stress and strain thereby shortening its useful life. Safeguards combating misuse are especially warranted in electric equipment like electric cord reels which convey current and where dangers of short circuits may develop through wear.

SUMMARY OF THE INVENTION

In the present electric cord reel, a hub portion around which the cord is wound has a limited degree of free radial movement with respect to a shaft with which the reel relatively rotates. In this way the reel is resiliently mounted with respect to the shaft and can absorb or interrupt mechanical jars transmitted to the hub portion.

To impart flexibility, the hub portion is preferably formed from a lightweight flexible plastic; and to simplify construction and reduce the cost of assembly, the hub portion is preferably molded as a single piece with other companion parts, such as at least one flange and an interior wall member. The resulting integral unitary member can be adapted to support substantially the remaining parts of the reel.

In one form, the hub member of the present reel is tubular and has an apertured wall member extending across the interior of the hub member to divide it into two housing chambers, one on either side of the wall member. This aperture is oversized with respect to a shaft extending axially through the hub member so as normally to avoid a bearing relation between the hub and shaft. A commutator block fitted into one of the housing chambers has a tubular projection defining a bearing in which the shaft is rotatably received. The shaft bearing as well as the shaft are normally free of any bearing or supporting relation with respect to the wall member in a direction radially of the hub member or reel. The other housing chamber contains a spring motor adapted to urge the reel toward a home position or one in which the cord is wound upon the reel.

In use, the hub member has a limited resilient movement radially of the reel which can be effected by sudden or excessive pulls or jerks upon the electric cord. However, such movement cannot exceed a predetermined amount, since it is checked upon eventual contact by an edge of the aperture of the wall member with another member of the reel, usually the shaft.

DESCRIPTION OF THE PREFERRED EMBODIMENTS

Figure 1:
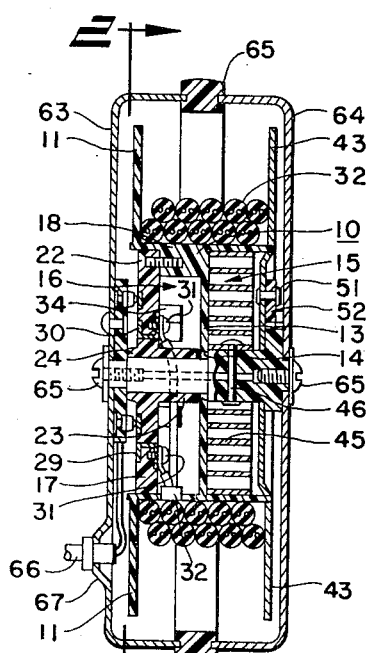
FIG. 1 is a radial, cross-sectional view of an electric cord reel of the present invention.

Referring to the drawings, the embodiment illustrated includes a molded plastic hub portion 10 having a plastic integral flange 11 adjacent one end and a plurality of axially extending, circumferentially spaced tab portions 12 at its other, free end. Substantially midway between such ends, a wall member 13 having an aperture 14 extends generally radially across the hub portion 10 to divide it into separate housing chambers generally indicated at 15 and 16 on opposite sides of the wall member.

On one side of wall member 13, a commutator block 17 fits in housing chamber 16. Molded directly along the internal periphery of the plastic hub portion 10 in housing chamber 16 are three axially disposed ribs 18, approximately 120° apart, the outer ends of which have open notches 20. Commutator block 17 is disc-shaped and has radial tabs 21 which mate with notches 20 of the ribs. The tabs 21 may make a frictionally-held, snap-fit within the notches, or flat head bolts 22 may secure the tabs in position by threadably penetrating into ribs 18 (FIG. 1).

Figure 6:
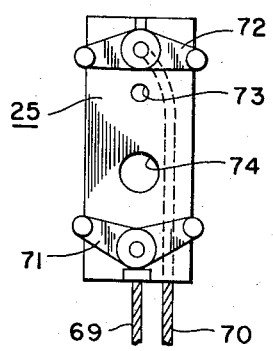
FIG. 6 is a front elevational view of a commutator contact block for maintaining an electrical connection between an electric current supply and the commutator block of FIG. 2.

The commutator block 17 comprises a heat resistant, insulating plastic like the formaldehyde resins, such as phenol-formaldehyde, and has a central opening aligned with an integral annular sleeve 23. The sleeve extends toward but is free of any bearing relation with wall member 13. Sleeve 23 may terminate short of wall member 13 or contact it from one side. However, it is important in accordance with the present invention to avoid a bearing or supporting relation between sleeve 23 and wall member 13 in a direction radially of hub portion. On its opposite side, block 17 has an integral annular boss 24 that is coaxial with sleeve 23 and which spaces a commutator contact block 25 (FIG. 6) from block 17, as hereinafter described.

Figure 2:
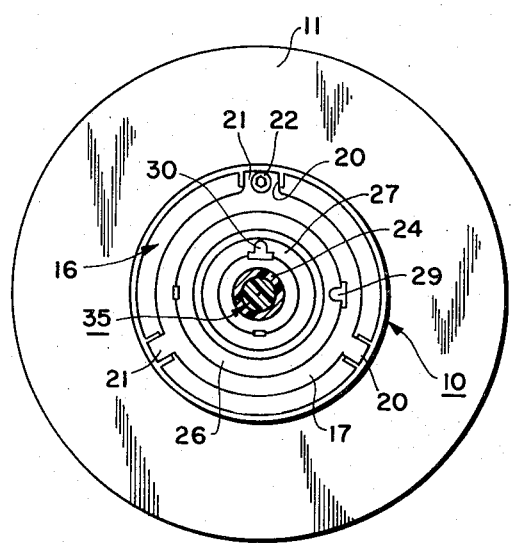
FIG. 2 is a section of FIG. 1 on the line 2—2.
Figure 3:
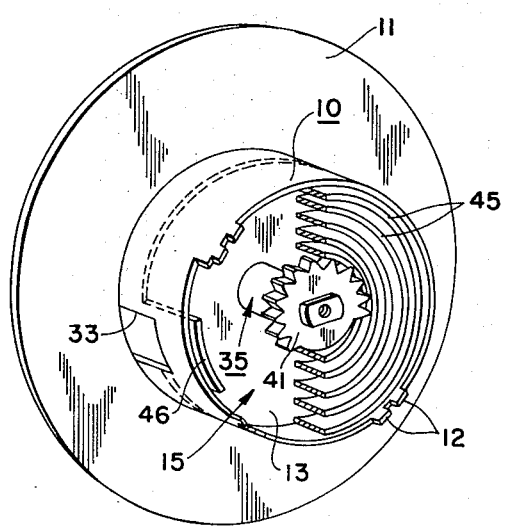
FIG. 3 is a perspective view of the reverse side of the hub and flange member of FIG. 2 and illustrates a housing chamber for a coiled spring, the spring being shown in half section for purposes of illustration.

On a side remote from wall member 13, block 17 also has a pair of spaced flat brass rings 26 and 27 concentric with annular sleeve 23 and tightly fitted within two matching circular depressions (FIG. 2). Each ring has a tab 29 and 30, respectively, which extend through openings in commutator block 17. Small bolts 31 (FIG. 1) attach two connectors of an electric cord 32 to the turned, flat positions of tabs 29 and 30 and in this manner electrically connect the cord 32 to commutator block 17. The cord leaves chamber 16 by passing through an opening 33 in the hub portion (FIG. 3) and winds around the exterior of the hub portion between its flanges. To this end, commutator block 17 may have arcuate vanes 34 between or around which cord 32 passes to relieve strain on the cord and particularly its connection to the commutator block. The end of the cord (not shown) may terminate in a conventional two-prong plug, electric jack, or the like.

Figure 5:
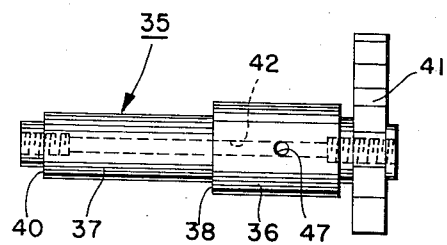
FIG. 5 is a side elevational view of a combined, integral shaft and ratchet.

A shaft, generally indicated at 35, passes through aperture 14 of wall member 13, the aperture being oversized with respect to the shaft, and rotatably seats within sleeve 23 of commutator block 17. The shaft has successively narrowing offset sections 36 and 37 (FIG. 5). Offset section 36 defines a seat 38 for abutting the shaft laterally against wall member 13 from chamber 15, as shown in FIG. 1, but without affecting a bearing or supporting relation with the wall member radially of the reel. Offset section 37 defines a seat 40 for commutator contact block 25 (FIG. 1).

Although ratchet and pawl means are not essential, in the preferred form these elements are used and the shaft and ratchet are also combined and molded from plastic as one piece. As shown especially in FIG. 5, the shaft 35 comprises a ratchet configuration 41 molded integrally with one end of the shaft. The shaft and ratchet combination has an axial passage 42, the ends of which are suitably internally threaded. A second flange 43, essentially equal in size to flange 11, has slotted, rectangular openings 44 spaced peripherally to receive the tabs 12 of the free end of the hub portion 10. If desired, the openings 44 and tabs 12 may be dimensioned to provide a tight, frictional press fit. Or, if desired, when the plastic of the hub portion 10 is thermoplastic, the tabs 12 may be heat-sealed over the outer face of flange 43 after it is seated in position. Depending upon the physical demands to be placed on the electric cord reel during use, flange 43 can be either plastic or metal. When plastic, flange 43 can be of the same or different plastic as that used for any of the other plastic parts. To rigidify and strengthen the overall assembly, it is preferred to make flange 43 from metal, such as galvanized sheet metal.

A spring motor automatically returns the reel to a home or wound position when the ratchet and pawl are disengaged. In the illustrated embodiment, a spirally coiled spring 45 concentrically fits within housing chamber 15. An arcuate rib or vane 46 integral with wall member 13 is secured as by riveting to an outer end of spring 45, while a rivet 46 (FIG. 1) secures an inner end of the spring to an opening 47 in shaft 35.

Figure 4:
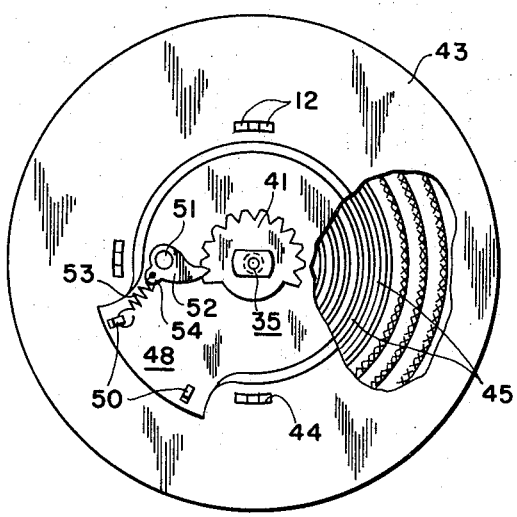
FIG. 4 is a side elevational view, with parts broken away of a second flange after attachment to the free end of the hub member of FIG. 3.

The particular ratchet and pawl combination used does not form a part of the present invention and may be any known in the art. For example, the ratchet and pawl structures may be those disclosed in Blanch and Olzak U. S. Pat. No. 3,432,623 or in Blanch and Olzak U. S. Pat. No. 3,450,369. In the embodiment illustrated, flange 43 has a slanting ledge area 48 (FIG. 4) having a pair of punched out tabs 50. Rivet 51 rotatably secures a pawl 52 to flange 43 and a coiled spring 53 connects an 54 of the pawl to one of the tabs 50. To reverse the operation of the pawl 53, that is, to go from a clockwise payout rotation to a counterclockwise payout rotation or vice versa, pawl 52 is turned over on its other side and spring 53 attached to the other tab 50, all in accordance with the teachings of the cited Blanch and Olzak U. S. Pat. No. 3,450,369.

Figure 7:
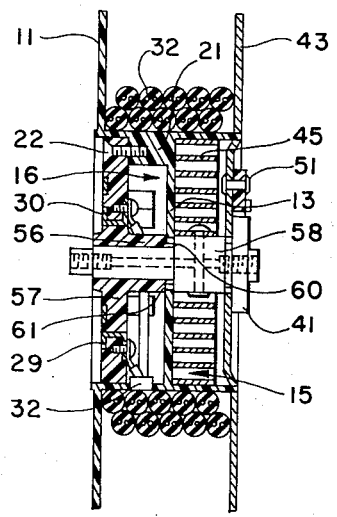
FIG. 7 is a radial, cross-sectional view similar to that of FIG. 1 and illustrates a modified form of commutator block.

FIG. 7 illustrates a modified form of a commutator block, the remaining parts of the reel being similar to corresponding parts of FIG. 1 and bearing like reference numbers. In this case, an annular bearing sleeve 56 on a commutator block 57 extends through wall member 13 to support a shaft 58 along a somewhat greater length, even into housing chamber 15 a distance greater than that illustrated, if desired, with consequent narrowing of the axial distance of the widest section of shaft 58 as compared to shaft 35. In this case, the outside diameter of the annular bearing sleeve 56 is reduced as at 60, and the reduced portion extends through aperture 14 in wall member 13. The aperture 14 is oversized with respect to the reduced position so as to avoid any bearing relation therewith. If desired, a shoulder 61 formed on the outer side of bearing sleeve 56 can abut against a side of wall member 13 to rigidify the structure, but in any case there is no bearing or supporting relation between wall member 13 and sleeve 56 in a direction radially of the reel.

Figure 8:
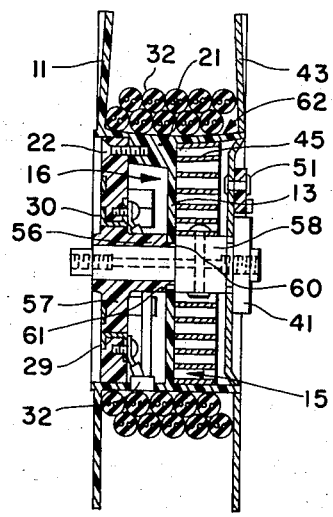
FIG. 8 is a semi-diagramatic, radial, cross-sectional view of the reel portion of FIG. 7 and shows the hub member flexed inwardly to a cambered position on one side of the reel.

In use, whenever the embodiment of either FIGS. 1 or 7 receives an excessive pull on cord 32, or whenever a mechanical jar or the like is transmitted to hub portion 10 that exceeds its resistance to the pull or jar, that section of the hub portion receiving the brunt of the force flexes radially inwardly to a slightly depressed shape illustrated by FIG. 8. The outer surface of the hub member assumes a somewhat concave, cambered position as shown at 62. The maximum extent of the camber is determined by the size of the opening in the wall member, that is, by how far the wall member moves inwardly until an edge of aperture 14 contacts a shaft. At this time the wall member and attendant reel parts resist further deformation.

While, if desired, an electric cord reel may be used with only the parts previously described in assembly and suitable electric means employed to supply electrical energy to the rings 27 and 26 of the commutator block 17 (or that of the embodiment of FIG. 7), it is preferable for reasons of safety and appearance to encase the electric cord reel in a suitable housing having a peripheral opening through which the cord 32 may pass. The reel housing shown in the illustrated embodiment includes a pair of cooperating, bowl-shaped outer sections 63 and 64 held to the ends of shaft 35 by bolts 65 which engage the internal, threaded openings of the passage 42. In this respect, the offset section 37 on shaft 35 is preferably flush with the end of the annular boss 24 to provide sufficient room for contact block 25 next to section 63. An elastomeric band 65 has grooves along its sides to receive the edges of sections 63 and 64 and thereby complete the housing.

An electric potential is supplied to the inner end of cord 32 through an inlet conductor 66 which enters section 63 through an offset portion 67 and connects its two leads 69 and 70 (FIG. 6) to contact brushes 71 and 72, respectively, carried by contact block 25. A rivet 73 secures block 25 to section 63, the block having an opening 74 freely to pass the shaft 35. The inner and outer commutator rings 27 and 26 engage the contact brushes 71 and 72, respectively, and thereby transfer an electric potential to the dual conductors of cord 32.

The reel assembly may be adapted for many applications. For example, the reel may be attached to the end of a tank-type vacuum cleaner. The present electric cord reel is easy to assemble, most parts fitting directly into either of the housing chambers 15 or 16. The reel is, therefore, well adapted for a production line technique. The number of rivets and bolts is substantially reduced. Soldering and welding are entirely eliminated from the reel structure, although in some instances the electrical leads of cord 32 may be soldered to tabs 29 and 30 of the commutator rings. Moreover, because of the use of many plastic component parts, a minimum of lubrication, if any, is required.

As used here and in the claims, the term "plastic" is taken to mean any of the well-known, synthetic, organic, resinous polymers suitable for molding. As an example, such plastics may include the acrylic polymers such as polymethyl methacrylate; the cellulosic molding compounds such as ethyl cellulose, cellulose acetate, cellulose acetate butyrate, and cellulose nitrate; polyethylene, polypropylene; polystyrene; polyvinyl polymers such as polyvinyl chloride, polyvinylidene chloride, polyvinyl acetate, polyvinyl alcohol, polyvinyl butyral, and copolymers thereof; polyurethanes; melamine-formaldehyde and urea-formaldehyde molding compounds; phenol-formaldehyde and phenol-furfural molding compounds; polyesters, epoxy resins; polytetrafluorethylene; and the like. Polyamides such as nylon are preferred.

While the foregoing describes presently preferred embodiments, it is understood that the invention may be practiced in still other forms within the scope of the following claims.

We claim:

1. In an electric cord reel, a generally tubular hub portion of flexible plastic material, flange members extending radially with respect to said hub portion adapted to receive an electric cord therebetween, an apertured wall member extending across the interior of the hub portion to divide it into housing chambers on opposite sides of the wall member, a commutator block fitted into one of said housing chambers having a hollow projection defining a shaft bearing and adapted to receive a shaft, the aperture of said wall member being of a size greater than the transverse dimension of such a shaft to pass the shaft without normally effecting a bearing relation therewith whereby said hub portion is adapted to flex radially of a shaft to absorb shocks and the like, and a spring motor in the other of said housing chambers adapted to urge the hub portion to rotate in a predetermined direction.

2. The electric cord reel of claim 1 in which said hub portion, wall member, and at least one flange member are integrally formed and define a unitary member adapted to support substantially the remaining parts of the reel.

3. The electric cord reel of claim 2 in which said unitary member is formed from a plastic material.

4. The electric cord reel of claim 1 including a shaft disposed within said shaft bearing and having a radially offset section to contact a side of said wall member without effecting a supporting relation therewith radially of the reel.

5. The electric cord reel of claim 1 in which said spring motor is a coiled spring, one portion of said spring is adapted to be secured to such shaft, and another portion of the coiled spring is secured with respect to said hub portion.

6. The electric cord reel of claim 1 including a shaft disposed within said shaft bearing, ratchet means fixed with respect to said shaft, and pawl means fixed with respect to said hub portion engagable with said ratchet means.

7. The electric cord reel of claim 6 in which said shaft and ratchet means are integrally formed from a plastic material.

8. The electric cord reel of claim 1 in which said commutator block is removably fitted into said one housing chamber.

9. The electric cord reel of claim 1 including a shaft disposed within said shaft bearing, and in which said commutator block has commutator rings on a side remote from said wall member, and a commutator contact block mounted on said shaft for rotation relative to the commutator block is adapted to contact said commutator rings of the block.

10. The electric cord reel of claim 1 in which said hollow projection of the commutator block contacts a side of said wall member without effecting a supporting relation therewith radially of the reel.

11. The electric cord reel of claim 1 in which said hollow projection of the commutator block extends through the aperture of said wall member without effecting a bearing relation therewith radially of the reel.

12. The electric cord reel of claim 1 in which the aperture of said wall member is adapted to contact a part of said electric cord reel upon said radial flexing of the hub portion and thereby limit the extent of such flexing.

* * * * *